Patented Aug. 18, 1942

2,293,026

UNITED STATES PATENT OFFICE 2,293,026

AMINO ACID ESTERS

Harold Milton Day, Cos Cob, and David Walker Jayne, Jr., Old Greenwich, Conn., assignors to American Cyanamid Company, New York, N. Y., a corporation of Maine No Drawing. Application June 5, 1940, Serial No. 338,926

9 Claims. (Cl. 260—481)

The present invention relates to sulfonic acid salts of amino-carboxylic acid esters and particularly the esters of higher aliphatic alcohols.

We have found that compounds possessing useful properties can be prepared by reacting an organic sulfonic acid with an aliphatic amino-carboxylic acid to form an addition salt which on adding a higher aliphatic alcohol at elevated temperatures, yields a reaction product which is most probably an ester. Such compounds are useful as detergents, emulsifying and dispersing agents, and are particularly suitable in mineral dressing as flotation reagents.

Any organic sulfonic acid may be used to prepare the salts of the esters of the present invention. Thus the saturated or unsaturated aliphatic sulfonic acids, alicyclic, aryl or aralkyl sulfonic acids can be used in which the organic radical attached to the sulfonic acid group is either unsubstituted or contains substituent groups.

The amino-carboxylic acids useful in preparing the ester salts may be produced by any of the known methods such as the action of ammonia on cyanhydrins followed by hydrolysis and include such aliphatic amino-carboxylic acids as glycine, alanine, alpha-aminobutyric acid, valine, norvaline, leucine, isoleucine and norleucine. Diamino, monocarboxylic acids such as ornithine, lysine and arginine may also be employed in which case two sulfonic acid molecules would be required for each molecule of the diamino carboxylic acid. Furthermore, monoamino, dicarboxylic acids may be employed to form the products of the present invention such as glutamic acid which will react with two molecules of the higher alcohol to form a double ester, or if glutamine, the half amide of glutamic acid is used only one esterifiable hydrogen remains. Other substituents such as hydroxyl radicals may be attached to one or more of the carbon radicals of the aliphatic amino-carboxylic acid used.

Esterification of the organic sulfonic acid addition salt of the aliphatic amino-carboxylic acid is brought about by adding an approximately equimolecular amount of an alcohol to the acid salt. The alcohol may be of the straight or branched chain type and may be saturated or unsaturated. Representative alcohols are those such as methyl, ethyl, propyl, isobutyl, etc., an alicyclic alcohol such as cyclohexanol, an aralkyl alcohol such as benzyl and phenylethyl alcohol, or a substituted alcohol such as polyhydric, ether, and amino alcohols. We have found, however, that when higher fatty alcohols are employed such as 2-ethylhexanol, capryl, lauryl, or corresponding higher fatty alcohols, the products are of high molecular weight and are particularly well adapted as wetting agents and promoters in the flotation of acidic silicious gangue. Higher aliphatic alcohols containing 8 carbon atoms or more and crude mixtures such as technical lauryl alcohol which contains higher and lower alcohols in addition to lauryl alcohol, are preferred in making the products of the present invention, but in a broader sense, any alcohol may be used.

While the compounds of the present invention are most probably sulfonic acid salts of amino acid esters we do not desire to limit the invention by such a positive designation and prefer to broadly include any or all products produced by reacting an organic sulfonic acid with an aliphatic amino-carboxylic acid and an alcohol.

In preparing the products of the present invention the reactants may be charged into the reaction vessel simultaneously in which case esterification and salt formation occur at substantially the same time, or one step may be performed prior to the other. For example in some cases it may be desirable to first prepare the sulfonic acid salt of the amino-carboxylic acid and carry out esterification as a separate step. When the amino and sulfonic acids are both solids a small amount of water added in the first step will insure a homogeneous melt and more complete esterification results. In general, the mode of reaction as well as the temperature to be employed depends largely on the nature of the reactants. For example in order to effect reaction elevated temperatures must be employed ranging from about 100°–300° C. depending primarily on the molecular weight of the alcohol used in the esterification step when the other reactants are kept constant. Higher alcohols require higher reaction temperatures and it is therefore sometimes economically desirable to react an amino-carboxylic acid with a sulfonic acid at moderate temperatures and then carry out esterification with a a higher alcohol at a higher temperature.

The invention will be further described in conjunction with the following specific examples which illustrate the preparation of typical products of the present invention. However, it is not intended that the invention be in any way limited by the procedural steps therein set forth, nor to the particular compounds obtained. The parts are by weight.

Example 1

19 parts of p-toluene sulfonic acid was added to 7.5 parts of glycine. 19 parts of technical lauryl alcohol was added to this mixture and the mix heated to 175° C. with the evolution of steam, resulting in a clear dark liquid. The mix was cooled and the product obtained was a black paste which on dissolving in water gives a foamy solution that readily wets wool. The product is soluble in alcohol and hydrocarbons.

Example 2

19 parts of p-toluene sulfonic acid was added to 7.5 parts of glycine. 13 parts of 2-ethyl hexanol was added and the mix heated to 205° with the evolution of steam. At 180° C. the cloudiness disappeared and a homogeneous dark liquid resulted. The cold product is a dark green paste, soluble in water to give a clear foamy solution that readily wets wool.

Example 3

To 15 parts of glycine was added 32 parts of benzene sulfonic acid and a trace of water and this mix heated to 130° C. 40 parts of technical lauryl alcohol was added and the temperature carried to 200° C. with the evolution of steam. At 160° the two layers that had formed originally became completely miscible and the cold product was obtained as a brown paste, completely dispersible in water to give a foamy solution that readily wets wool.

Example 4

To 9 parts of alpha-amino isobutyric acid was added 19 parts of p-toluene sulfonic acid and a trace of water and the mix heated to 130° C. 20 parts of technical lauryl alcohol was added and the mix heated to 230° C. with the evolution of steam. The product when cold was a viscous brownish-black oil dispersible in water to give a foamy solution that readily wets wool.

The sulfonic acids, amino-carboxylic acids and alcohols in the examples can be replaced wholly or in part by varying quantities of alternative reactants such as those described earlier in the specification. Other higher aliphatic alcohols which may be substituted in the above examples to yield the preferred products of the present invention include pure alcohols such as n-hexanol, n-octylalcohol, n-nonylalcohol, n-decylalcohol, n-undecylalcohol, n-dodecylalcohol, n-tridecylalcohol, myristylalcohol and n-pentadecyl alcohol; alcohol mixtures obtainable by the carboxylic hydrogenation of essentially saturated fatty oils such as coconut oil or palm kernel oil; polyunsaturated alcohols obtained from drying oils by reduction of the ester group to a carbinol group such as China-wood oil, perilla oil, soya bean oil; and also alcohols obtainable from sodium reduction of marine animal oils such as herring oil, sardine oil and shark oil. In every case the product obtained disperses in water to give a foamy solution with high wetting properties, and is soluble in alcohol and hydrocarbons.

What we claim is:

1. A process of producing chemical compounds which comprises reacting together at elevated temperatures substantially equivalent molecular proportions each of an organic sulfonic acid, an aliphatic amino-carboxylic acid and an alcohol.

2. A process of producing chemical compounds which comprises reacting together at elevated temperatures substantially equivalent molecular proportions each of an aromatic sulfonic acid, an aliphatic amino-carboxylic acid and an aliphatic alcohol containing at least 8 carbon atoms.

3. An aliphatic alcohol ester of an organic sulfonic acid salt of an aliphatic aminocarboxylic acid.

4. An aliphatic alcohol ester of an aromatic sulfonic acid salt of an aliphatic aminocarboxylic acid, wherein the aliphatic alcohol contains at least eight carbon atoms.

5. The lauryl alcohol ester of p-toluene sulfonic acid salt of glycine.

6. The 2-ethyl hexanol ester of the p-toluene sulfonic acid salt of glycine.

7. The lauryl alcohol ester of the p-toluene sulfonic acid salt of alpha-amino-isobutyric acid.

8. An ester of an aromatic sulfonic acid addition salt of an aliphatic aminocarboxylic acid.

9. A higher aliphatic alcohol ester of an organic sulfonic acid addition salt of an aliphatic aminocarboxylic acid.

HAROLD MILTON DAY.
DAVID WALKER JAYNE, Jr.